US012759248B2

(12) United States Patent
Tsotsis et al.

(10) Patent No.: US 12,759,248 B2
(45) Date of Patent: Oct. 13, 2026

(54) METHODS FOR MANUFACTURING HAT-STIFFENED STRUCTURES

(71) Applicant: The Boeing Company, Chicago, IL (US)

(72) Inventors: Thomas Karl Tsotsis, Santa Ana, CA (US); Andrew Milton Harber, Guntersville, AL (US)

(73) Assignee: The Boeing Company, Arlington, VA (US)

( * ) Notice: Subject to any disclaimer, the term of this patent is extended or adjusted under 35 U.S.C. 154(b) by 697 days.

(21) Appl. No.: 18/065,458

(22) Filed: Dec. 13, 2022

(65) Prior Publication Data

US 2024/0190088 A1 Jun. 13, 2024

(51) Int. Cl.
*B29C 70/48* (2006.01)
*B29C 70/22* (2006.01)
*B29L 31/00* (2006.01)

(52) U.S. Cl.
CPC ............ *B29C 70/48* (2013.01); *B29C 70/226* (2013.01); *B29L 2031/003* (2013.01)

(58) Field of Classification Search
CPC ..... B29C 33/505; B29C 33/485; B29C 33/42; B29C 70/541; B29C 70/465; B29C 70/48
See application file for complete search history.

(56) References Cited

U.S. PATENT DOCUMENTS 4,721,593 A 1/1988 Kowal
5,059,377 A 10/1991 Ashton et al.
5,152,949 A 10/1992 Leoni et al.
6,702,911 B2 * 3/2004 Toi ............................ B64C 1/12 264/258
2005/0257887 A1 * 11/2005 Tsotsis .................... B29B 11/16 156/308.2
2007/0063378 A1 3/2007 O'Donoghue
2008/0302912 A1 * 12/2008 Yip ....................... B29C 70/446 244/119
2010/0239865 A1 9/2010 Kallinen
2010/0295210 A1 11/2010 Le Hetet
2011/0206875 A1 * 8/2011 Kohlen ................. B29C 33/485 264/319
2014/0353876 A1 12/2014 Murai et al.
2016/0339615 A1 11/2016 Abe et al.
(Continued)

FOREIGN PATENT DOCUMENTS

EP 0142697 A1 5/1985
EP 1473132 A2 11/2004
(Continued)

OTHER PUBLICATIONS

European Patent Office Extended Search Report, dated May 10, 2024, regarding Application No. EP23216222.2, 8 pages.
(Continued)

*Primary Examiner* — Matthew J Daniels
(74) *Attorney, Agent, or Firm* — Yee & Associates, P.C.

(57) ABSTRACT

Stiffened composite skin and methods of manufacture. A dry, hat-shaped preform is applied into a recess in a lower mold tool. A first set of dry, skin-preform layers is applied over the dry, hat-shaped preform to form a dry preform assembly. Resin is infused into the dry preform assembly to form a resin-infused preform. The resin-infused preform is cured in situ to form the stiffened composite skin.

29 Claims, 10 Drawing Sheets

(56) References Cited

U.S. PATENT DOCUMENTS

| | | | | |
|---|---|---|---|---|
| 2020/0079038 | A1 | 3/2020 | Tessier et al. | |
| 2023/0294371 | A1* | 9/2023 | Kitazawa | B29C 43/34 |

FOREIGN PATENT DOCUMENTS

| | | | |
|---|---|---|---|
| EP | 2121295 | A1 | 11/2009 |
| EP | 3115185 | A1 | 1/2017 |
| EP | 4059688 | A1 | 9/2022 |
| EP | 4088915 | A1 | 11/2022 |
| GB | 2475523 | A | 5/2011 |
| WO | 2022190282 | A1 | 9/2022 |

OTHER PUBLICATIONS

European Patent Office Extended Search Report, dated May 29, 2024, regarding Application No. EP23216216.4, 8 pages.
Office Action, dated May 1, 2025, regarding U.S. Appl. No. 18/473,836, 16 pages.
Office Action, dated Jul. 10, 2025, regarding U.S. Appl. No. 18/473,836, 9 pages.
European Patent Office Extended Search Report, dated Jan. 21, 2026, regarding Application No. EP25199056.0, 6 pages.
Final Office Action, dated Oct. 24, 2025, regarding U.S. Appl. No. 18/473,836, 10 pages.

* cited by examiner

METHODS FOR MANUFACTURING HAT-STIFFENED STRUCTURES

BACKGROUND INFORMATION

1. Field

The present disclosure relates generally to composite structures and more specifically to manufacturing stiffened composite structures.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials are strong, lightweight materials created by combining two or more constituent materials. For example, a composite material may include reinforcing fibers bound in polymer-resin matrix. The fibers can take the form of a unidirectional tape, woven or non-woven cloth or fabric, or a braid.

Therefore, it would be desirable to have a method and apparatus that takes into account at least some of the issues discussed above, as well as other possible issues.

SUMMARY

An embodiment of the present disclosure provides a method of manufacturing a stiffened composite skin. A dry, hat-shaped preform is applied into a recess in a lower mold tool. A first set of dry, skin-preform layers is applied over the dry, hat-shaped preform to form a dry preform assembly. Resin is infused into the dry preform assembly to form a resin-infused preform. The resin-infused preform is cured in situ to form the stiffened composite skin.

Another embodiment of the present disclosure provides a method of manufacturing a stiffened composite skin. A dry preform assembly is laid up, the dry preform assembly comprising a second set of dry, skin-preform layers, a dry, hat-shaped preform with flanges in contact with the second set of dry, skin-preform layers, and a first set of dry, skin-preform layers positioned over and in contact with the dry, hat-shaped preform and the second set of dry, skin-preform layers. The dry preform assembly is infused with resin.

Yet another embodiment of the present disclosure provides a dry preform assembly. The dry preform assembly comprises a second set of dry, skin-preform layers, a dry, hat-shaped preform with flanges in contact with the second set of dry, skin-preform layers, and a first set of dry, skin-preform layers positioned over and in contact with the dry, hat-shaped preform and the second set of dry, skin-preform layers.

A yet further embodiment of the present disclosure provides a dry preform assembly. The dry preform assembly comprises a number of dry, hat-shaped preforms, in which each dry, hat-shaped preform of the number of dry, hat-shaped preforms is semi-rigid and tacked together; and a set of dry, skin-preform layers positioned over and in contact with the dry, hat-shaped preform.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. For example, the illustrative examples recognize and take into account that existing stiffened composite skins for aircraft primarily use blade stiffeners. The illustrative examples recognize and take into account that to process blade-stiffened composite skins, in-tool or pre-infusion compaction is used to achieve target fiber volumes and associated weight targets in the blade stiffeners.

Figure 1:
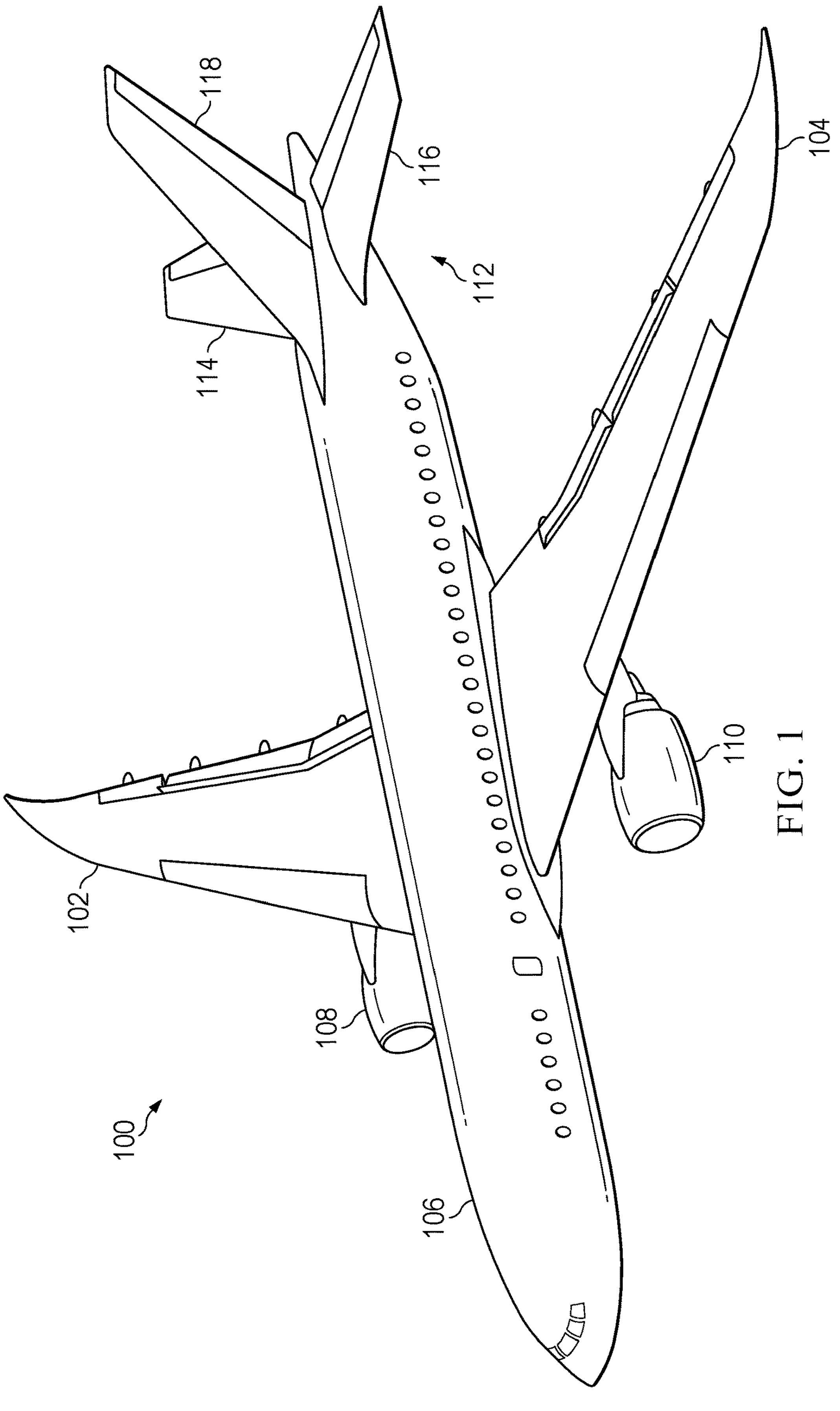
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having components formed using the methods of the illustrative example. Aircraft 100 is an example of an aircraft having composite components formed with hat-stiffened structures. For example, at least one of body 106, wing 102, or wing 104 can have a stiffened composite skin formed with hat stiffeners.

Figure 2:
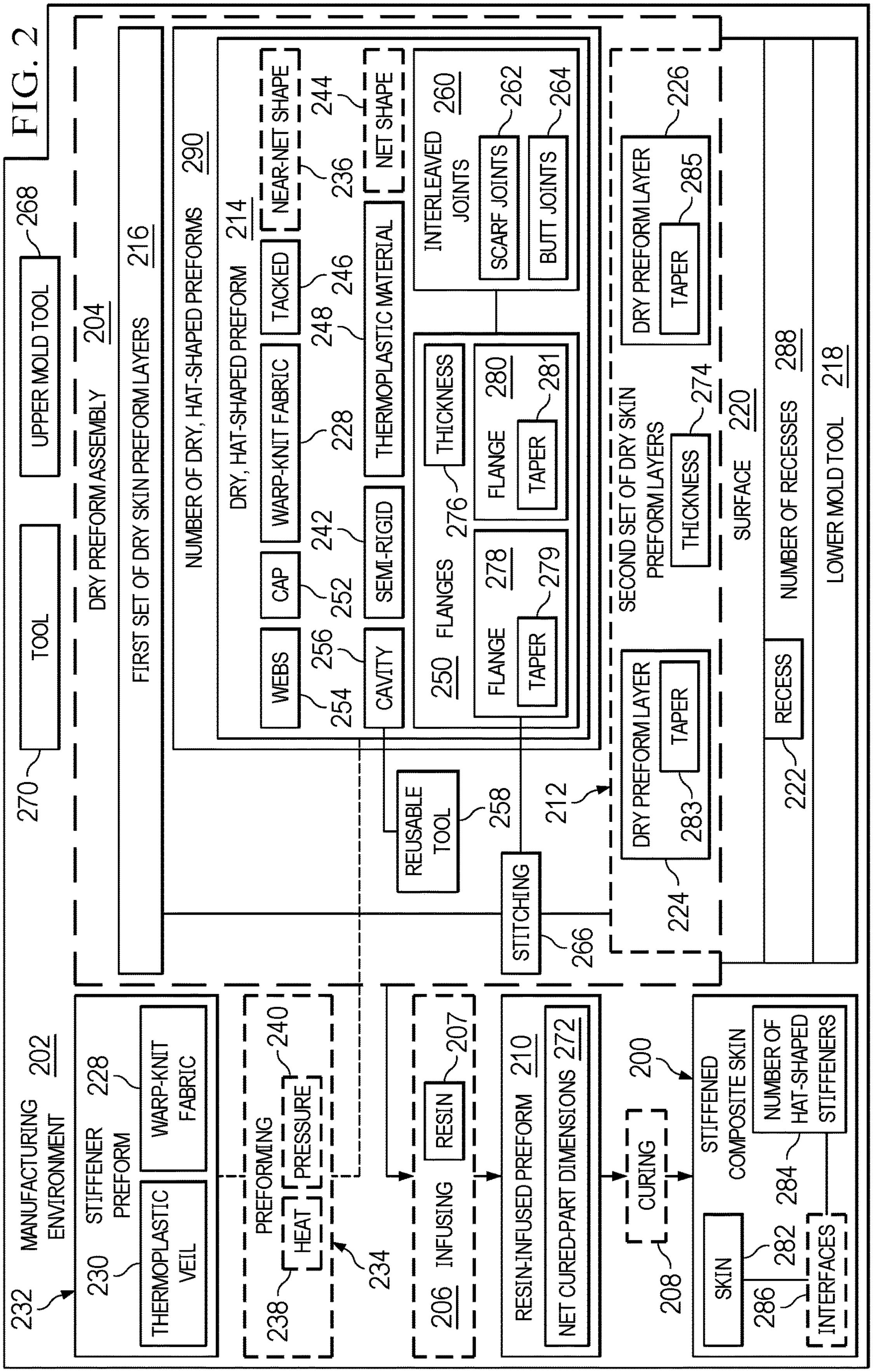
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Stiffened composite skin 200 formed in manufacturing environment 202 can be a portion of aircraft 100, such as a portion of body 106, wing 104, or wing 102.

Stiffened composite skin 200 is formed by laying up dry preform assembly 204, infusing 206 resin 207 into dry preform assembly 204, and then curing 208 resin-infused preform 210 to form stiffened composite skin 200. In some illustrative examples, dry preform assembly 204 comprises second set of dry, skin-preform layers 212, dry, hat-shaped preform 214, and first set of dry, skin-preform layers 216. As used herein, "a set of" items is one or more items. For example, second set of dry, skin-preform layers 212 comprises one or more dry, skin-preform layers. Second set of dry, skin-preform layers 212 is applied onto lower mold tool 218. Second set of dry, skin-preform layers 212 is applied to surface 220 of lower mold tool 218. Dry, hat-shaped preform 214 is applied into recess 222 in lower mold tool 218 and in contact with second set of dry, skin-preform layers 212.

In this illustrative example, second set of dry, skin-preform layers 212 comprises dry preform layer 224 and dry preform layer 226. Dry preform layer 224 and dry preform layer 226 are positioned on opposite sides of recess 222 in lower mold tool 218.

In some illustrative examples, warp-knit fabric 228 containing thermoplastic veil 230 is laid up to form stiffener preform 232. In some illustrative examples, preforming 234 is performed on stiffener preform 232 to near-net shape 236 to form dry, hat-shaped preform 214. In some illustrative examples, preforming 234 stiffener preform 232 comprises applying heat 238 and pressure 240 to stiffener preform 232 to tack together warp-knit fabric 228 by activating the thermoplastic veil 230 within warp-knit fabric 228 and to form dry, hat-shaped preform 214 that is semi-rigid 242.

In some illustrative examples, dry, hat-shaped preform 214 is semi-rigid 242 and tacked 246 together with a thermally activated binder. Thermally activated binder can take any desirable form. In some illustrative examples, thermally activated binder is a number of separate layers in stiffener preform 232. In some illustrative examples, the thermally activated binder takes the form of thermoplastic material 248 from thermoplastic veil 230.

In some illustrative examples, dry, hat-shaped preform 214 comprises warp-knit fabric 228. Dry, hat-shaped preform 214 comprises warp-knit fabric 228 tacked 246 by thermoplastic material 248 softened or partially melted by preforming 234 thermoplastic veil 230 within warp-knit fabric 228. In some illustrative examples, applying dry, hat-shaped preform 214 into recess 222 comprises forming dry, hat-shaped preform 214 to net shape 244.

Dry, hat-shaped preform 214 comprises flanges 250 connected to cap 252 by webs 254. Webs 254 are angled to allow ease of removal of stiffened composite skin 200 from lower mold tool 218. Webs 254 and cap 252 form cavity 256. In some illustrative examples, reusable tool 258 is applied inside dry, hat-shaped preform 214. Reusable tool 258 possesses a geometry of an inside of dry, hat-shaped preform 214. In this illustrative example, reusable tool 258 possesses a geometry of cavity 256 of dry, hat-shaped preform 214.

In one illustrative example, reusable tool 258 can take the form of an inflatable polymer-based bladder or the like with features to prevent adhesion/sticking to a respective stiffener after curing 208. In one illustrative example, reusable tool 258 can take the form of hollow geometry (polymeric or metallic) with an inflatable, removable, reusable bladder inside. In this illustrative example, the hollow geometry can become flyaway tooling.

Reusable tool 258 permits fabrication of hollow stiffening elements with ease of tool removal after curing 208. By using reusable tool 258, per-part tooling costs are reduced.

In some illustrative examples, second set of dry, skin-preform layers 212 is optional. In these illustrative examples, interleaved joints 260 are not present. In these illustrative examples, dry preform assembly 204 comprises number of dry, hat-shaped preforms 290 and first set of dry, skin-preform layers 216. In some of these illustrative examples, dry preform assembly 204 comprises number of dry, hat-shaped preforms 290, in which each dry, hat-shaped preform 214 of number of dry, hat-shaped preforms 290 is semi-rigid 242 and tacked 246 together; and first set of dry, skin-preform layers 216 positioned over and in contact with number of dry, hat-shaped preforms 290.

When second set of dry, skin-preform layers 212 is not present, stitching 266 can aid in reducing peel stresses. In some of these illustrative examples, dry preform assembly 204 further comprises stitching 266 connecting flanges 250 of the number of dry, hat-shaped preforms 290 to first set of dry, skin-preform layers 216.

When second set of dry, skin-preform layers 212 is present, flanges 250 form interleaved joints 260 with second set of dry, skin-preform layers 212 and first set of dry, skin-preform layers 216. In some illustrative examples, applying dry, hat-shaped preform 214 in contact with second set of dry, skin-preform layers 212 forms scarf joints 262. In some illustrative examples, applying dry, hat-shaped preform 214 in contact with second set of dry, skin-preform layers 212 forms butt joints 264.

In some illustrative examples, dry, hat-shaped preform 214 is slightly tapered from a first end to a second end longitudinally to enable easier removal of stiffened composite skin 200 after infusing 206 resin 207 and curing 208. This taper is present in the longitudinal direction of dry, hat-shaped preform 214. This longitudinal taper results in the hat-shape cross-sectional shape being slightly smaller at one end of dry, hat-shaped preform 214 than the hat-shape cross-sectional shape at the opposite end. The longitudinal tapering allows for stiffened composite skin 200 to be pulled in the direction of the larger end of the taper and more easily removed from lower mold tool 218. When stiffened composite skin 200 is removed from lower mold tool 218, it is pulled both up and towards the direction of the larger end of the taper. When stiffened composite skin 200 is removed from lower mold tool 218, stiffened composite skin 200 is not only pulled upward away from lower mold tool 218.

A desirable value for a longitudinal taper will depend on several factors related to stiffened composite skin 200. A desirable value for a longitudinal taper is selected based on at least one of a desired use for stiffened composite skin 200, anticipated stresses on stiffened composite skin 200, type of resin 207, lay up of stiffener preform 232, and other manufacturing considerations or operating considerations for stiffened composite skin 200. A desirable value for a longitudinal taper is chosen to advantageously affect removal of stiffened composite skin 200 without undesirably affecting operation of stiffened composite skin 200. In some illustrative examples, the longitudinal taper can be up to 10% difference between the two ends. In some illustrative examples, the longitudinal taper can be from 0.5% to 10% difference between the two ends. In some illustrative examples, the longitudinal taper can be from 0.5% to 6% difference between the two ends. In some illustrative examples, the longitudinal taper can be from 1% to 6% difference between the two ends. In some illustrative examples, the longitudinal taper can be from 2% to 5% difference between the two ends.

In some illustrative examples, second set of dry, skin-preform layers 212 have a greater thickness, thickness 274, than thickness 276 than flanges 250 of dry, hat-shaped preform 214. In these illustrative examples, second set of dry, skin-preform layers 212 is thicker than flanges 250 of dry, hat-shaped preform 214 so that interfaces 286 between number of hat-shaped stiffeners 284 and skin 282 are not at the surface of stiffened composite skin 200.

In some illustrative examples, tapers of second set of dry, skin-preform layers 212 overlap tapers of dry, hat-shaped preform 214 to position the interfaces in the interior of stiffened composite skin 200. In one illustrative example, taper 283 of dry preform layer 224 overlaps taper 279 of flange 278 of dry, hat-shaped preform 214 to bury an interface between dry preform layer 224 and flange 278 within skin 282 of stiffened composite skin 200. Burying the interface in the interior of skin 282 can reduce the peel stresses on the interface. In another illustrative example, taper 285 of dry preform layer 226 overlaps taper 281 of flange 280 of dry, hat-shaped preform 214 to bury an interface between dry preform layer 226 and flange 280 within skin 282 of stiffened composite skin 200. In these illustrative examples, interfaces 286 between number of hat-shaped stiffeners 284 and skin 282 in stiffened composite skin 200 are buried within skin 282. When an interface of interfaces 286 is buried within the interior of skin 282, the flange runout is not exposed on the surface of stiffened composite skin 200.

In some illustrative examples, to provide additional resistance to peeling, stitching 266 is performed through flanges 250 of dry, hat-shaped preform 214, second set of dry, skin-preform layers 212, and first set of dry, skin-preform layers 216. In some illustrative examples, stitching 266 comprises stitching 266 from a single side of dry preform assembly 204.

In some illustrative examples, prior to infusing 206 resin 207, upper mold tool 268 is lowered over dry preform assembly 204 to form a vacuum-sealed perimeter around dry preform assembly 204. Upper mold tool 268 and lower mold tool 218 form tool 270. Infusing 206 resin 207 into dry preform assembly 204 comprises infusing 206 resin 207 into tool 270 to fill dry preform assembly 204.

In some illustrative examples, upper mold tool 268 is closed onto resin-infused preform 210 to encapsulate resin-infused preform 210 to net cured-part dimensions 272 prior to curing 208 resin-infused preform 210.

After curing 208, tool 270 is opened by separating upper mold tool 268 and lower mold tool 218 for removal of stiffened composite skin 200 from lower mold tool 218. In some illustrative examples, stiffened composite skin 200 receives post-processing after removal from lower mold tool 218. Post-processing can include trimming, drilling, surface treatment, or other desired manufacturing operations.

The illustration of manufacturing environment 202 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, recess 222 is one of number of recesses 288. In some illustrative examples, number of recesses 288 includes more than one recess. As another example, dry, hat-shaped preform 214 is one of number of dry, hat-shaped preforms 290. In some illustrative examples, number of dry, hat-shaped preforms 290 comprises more than one dry, hat-shaped preform. In this illustrative example, second set of dry, skin-preform layers 212 comprises more than two dry, skin-preform layers. In this illustrative example, each dry, hat-shaped preform is in contact with two dry, skin-preforms of second set of dry, skin-preform layers 212.

Figure 3:
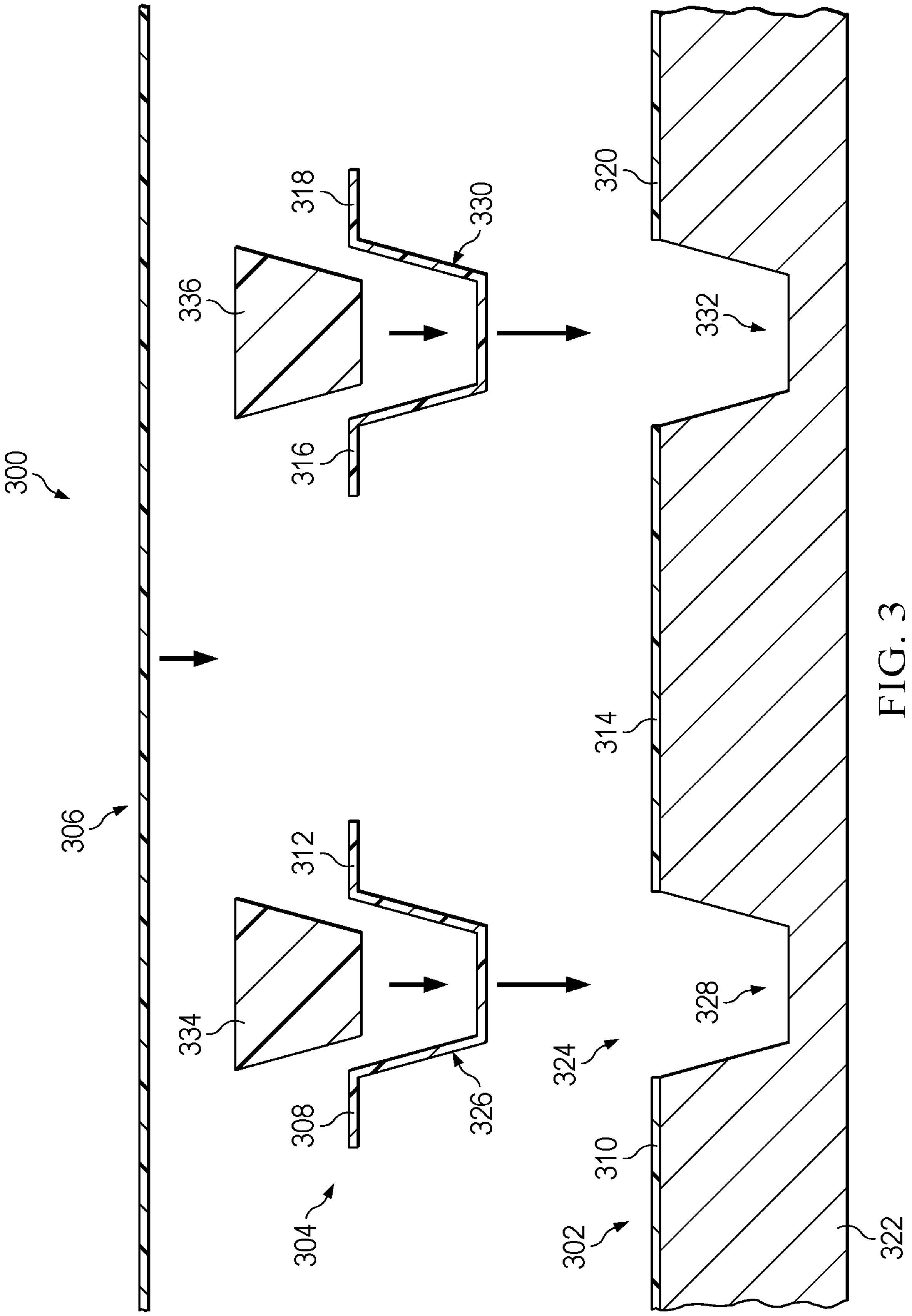
FIG. 3 is an illustration of a cross-sectional exploded view of a dry preform assembly in accordance with an illustrative embodiment.

Turning now to FIG. 3, an illustration of a cross-sectional exploded view of a dry preform assembly is depicted in accordance with an illustrative embodiment. Dry preform assembly 300 is a physical implementation of dry preform assembly 204 of FIG. 2.

Dry preform assembly 300 comprises second set of dry, skin-preform layers 302, number of dry, hat-shaped preforms 304, and first set of dry, skin-preform layers 306. Number of dry, hat-shaped preforms 304 have flanges configured to contact second set of dry, skin-preform layers 302. In an assembled state, flange 308 is in contact with dry, skin-preform layer 310. In an assembled state, flange 312 is in contact with dry, skin-preform layer 314. In an assembled state, flange 316 is in contact with dry, skin-preform layer 314. In an assembled state, flange 318 is in contact with dry, skin-preform layer 320.

First set of dry, skin-preform layers 306 is positioned over number of dry, hat-shaped preforms 304 and second set of dry, skin-preform layers 302. When assembled, first set of dry, skin-preform layers 306 is in contact with number of dry, hat-shaped preforms 304 and second set of dry, skin-preform layers 302.

Second set of dry, skin-preform layers 302 is applied onto lower mold tool 322. Number of dry, hat-shaped preforms 304 is applied into number of recesses 324 in lower mold tool 322 and in contact with second set of dry, skin-preform layers 302. To form dry preform assembly 300, dry, hat-shaped preform 326 of number of dry, hat-shaped preforms 304 is applied into recess 328 of number of recesses 324. To form dry preform assembly, dry, hat-shaped preform 330 of number of dry, hat-shaped preforms 304 is applied into recess 332 of number of recesses 324.

Reusable tool 334 is applied inside dry, hat-shaped preform 326. Reusable tool 334 possesses a geometry of an inside of dry, hat-shaped preform 326. Reusable tool 334 maintains geometry of dry, hat-shaped preform 326 during resin infusion and curing of dry preform assembly 300.

Reusable tool 336 is applied inside dry, hat-shaped preform 330. Reusable tool 336 possesses a geometry of an inside of dry, hat-shaped preform 330. Reusable tool 336 maintains geometry of dry, hat-shaped preform 330 during resin infusion and curing of dry preform assembly 300.

After applying first set of dry, skin-preform layers 306 over and in contact with number of dry, hat-shaped preforms 304 and second set of dry, skin-preform layers 302 to form dry preform assembly 300, resin is infused into dry preform assembly 300 to form a resin-infused preform. The resin-infused preform is cured in situ to form a stiffened composite skin.

Figure 4:
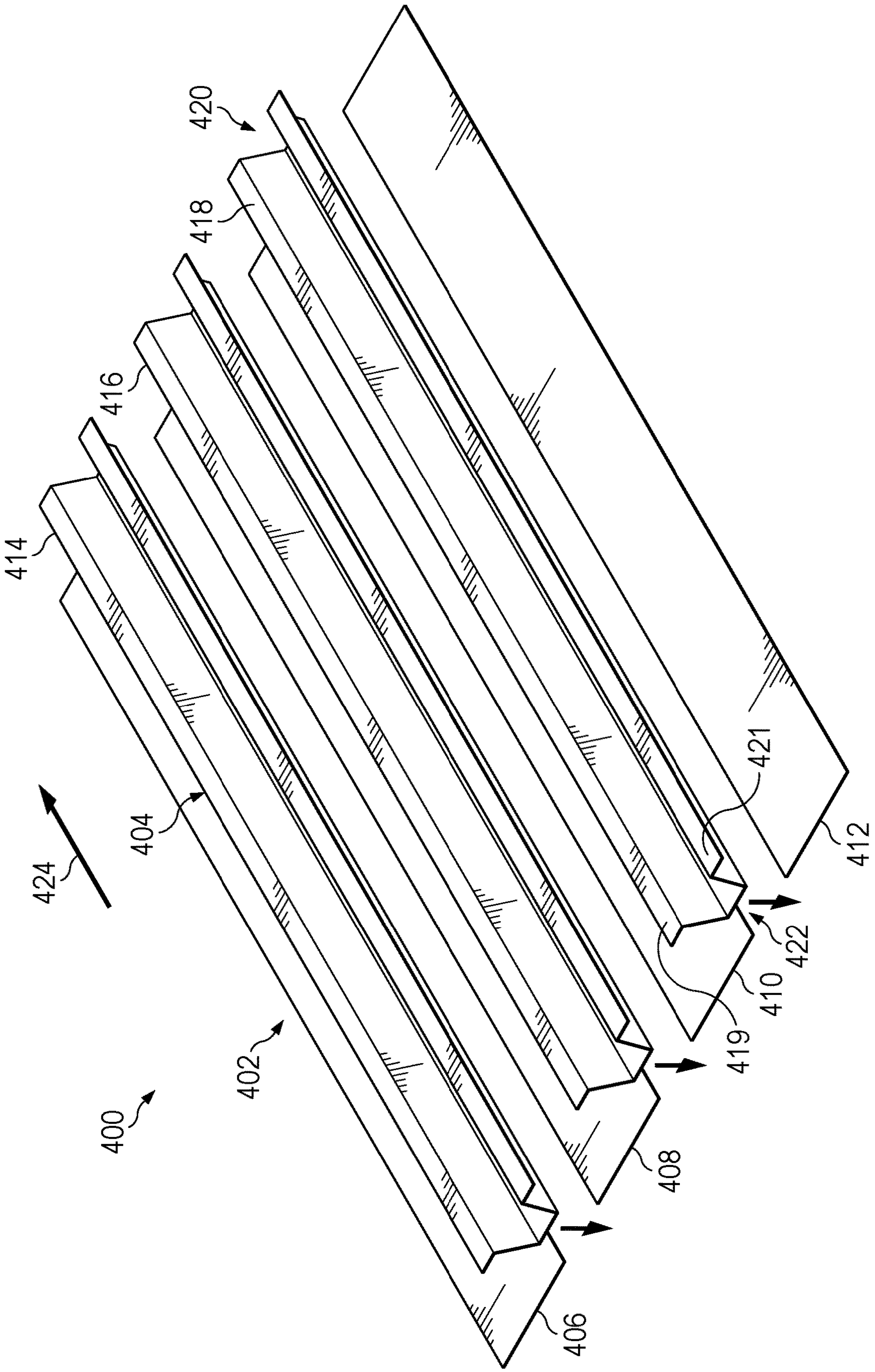
FIG. 4 is an illustration of an isometric view of portions of a dry preform assembly in accordance with an illustrative embodiment.

Turning now to FIG. 4, an illustration of an isometric view of portions of a dry preform assembly is depicted in accordance with an illustrative embodiment. Body 106, wing 104, or wing 102 could be formed using number of dry, hat-shaped preforms 400 and second set of dry, skin-preforms 402 of FIG. 4. Number of dry, hat-shaped preforms 400 are a physical implementation of number of dry, hat-shaped preforms 290 of FIG. 2. second set of dry, skin-preforms 402 are a physical implementation of second set of dry, skin-preform layers 212 of FIG. 2.

Number of dry, hat-shaped preforms 400 include dry, hat-shaped preform 404, dry, hat-shaped preform 406, and dry, hat-shaped preform 408. Each of number of dry, hat-shaped preforms 400 will be infused with resin to form stiffeners for a supported composite skin formed in part by second set of dry, skin-preforms 402.

Second set of dry, skin-preforms 402 comprises dry skin preform 410, dry skin preform 412, dry skin preform 414, and dry skin preform 416. Each of second set of dry, skin-preforms 402 will be infused with resin to form portions of a composite skin stiffened by hat-shaped stiffeners.

Number of dry, hat-shaped preforms 400 and second set of dry, skin-preforms 402 are infused with resin as part of a dry preform assembly (not depicted). Dry, hat-shaped preform 404 has flange 419 to be placed over and in contact with dry skin preform 410 to form a joint (not depicted). Dry, hat-shaped preform 404 has flange 421 to be placed over and in contact with dry skin preform 412 to form a joint (not depicted).

In some illustrative examples, number of dry, hat-shaped preforms 400 is longitudinally tapered. For example, dry, hat-shaped preform 418 is tapered from end 420 to end 422. In this illustrative example, hat-shaped preform 418 is larger at end 420 and smaller at end 422. By dry, hat-shaped preform 418 being longitudinally tapered, a resulting stiffened composite structure can be removed from a lower mold tool more easily by lifting and pulling in direction 424.

Figure 5:
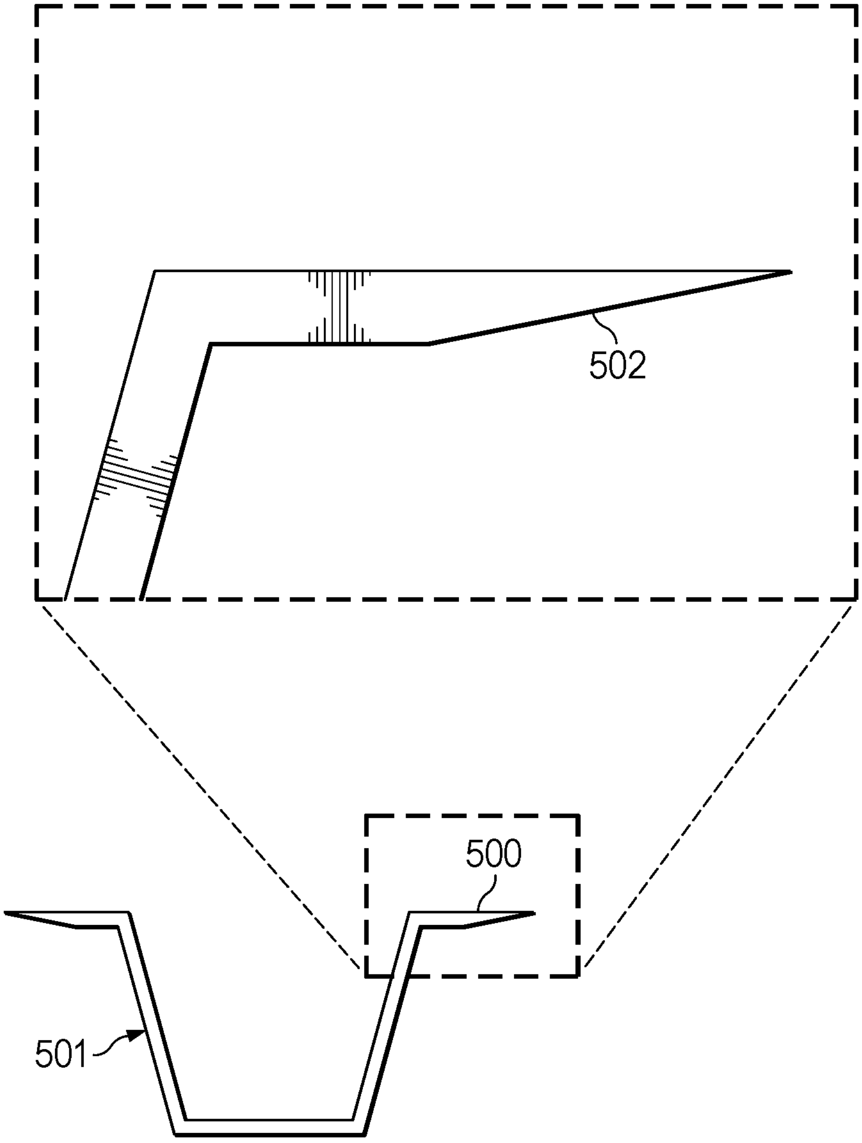
FIG. 5 is an illustration of a side view of a flange of a hat-shaped stiffener in accordance with an illustrative embodiment.

Turning now to FIG. 5, an illustration of a side view of a flange of a hat-shaped stiffener is depicted in accordance with an illustrative embodiment. Flange 500 can be present in a composite skin of one of body 106, wing 104, or wing 102 of aircraft 100 of FIG. 1. Flange 500 is a physical implementation of one of flanges 250 of FIG. 2. Flange 500 of dry, hat-shaped preform 501 can be a portion of one of number of dry, hat-shaped preforms 304 of FIG. 3. Flange 500 can be a portion of one of number of dry, hat-shaped preforms 400 of FIG. 4.

Flange 500 comprises taper 502. Taper 502 is formed by termination of plies of flange 500. Taper 502 can take the form of a series of steps. In some illustrative examples, taper 502 can be cut or machined at an angle. In some illustrative examples, taper 502 can be built in a stepped design. In some illustrative examples, taper 502 is configured to produce a scarf joint with a taper of a first dry skin preform.

Figure 6:
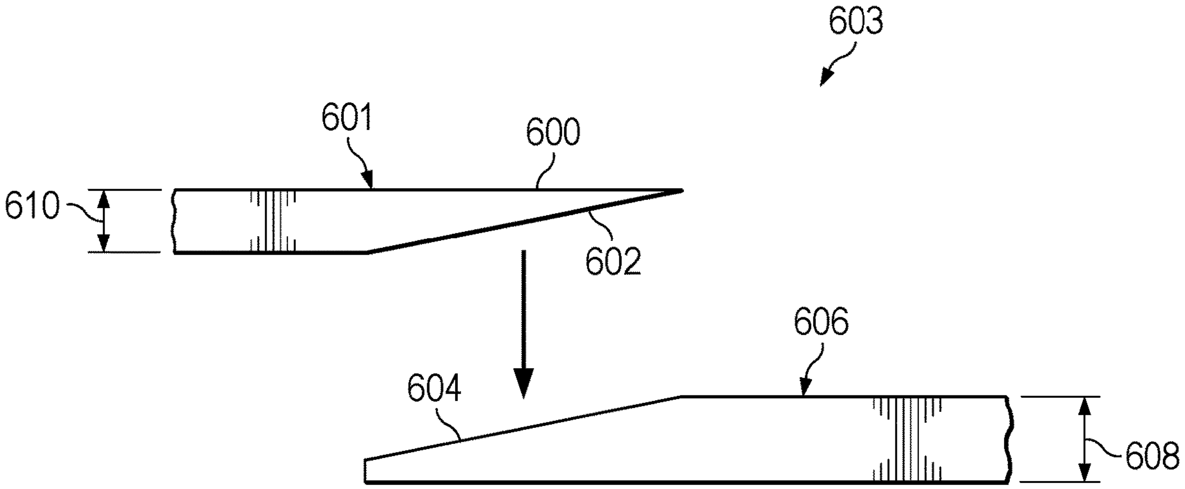
FIG. 6 is an illustration of a side view of a flange of a hat-shaped stiffener and a dry preform layer in accordance with an illustrative embodiment.

Turning now to FIG. 6, an illustration of a side view of a flange of a hat-shaped stiffener and a dry preform layer is depicted in accordance with an illustrative embodiment. Flange 600 can be present in a composite skin of one of body 106, wing 104, or wing 102 of aircraft 100 of FIG. 1. Flange 600 is a physical implementation of one of flanges 250 of FIG. 2. Flange 600 of dry, hat-shaped preform 601 can be a portion of one of number of dry, hat-shaped preforms 304 of FIG. 3. Flange 600 can be a portion of one of number of dry, hat-shaped preforms 400 of FIG. 4. In some illustrative examples, flange 600 is the same as flange 500.

In view 603, flange 600 has taper 602. Taper 602 of flange 600 is positioned above taper 604 of dry, skin-preform layer 606. As depicted, dry, skin-preform layer 606 has thickness 608 greater than thickness 610 of flange 600. By thickness 608 being greater than thickness 610 of flange 600, a joint formed at the interface of taper 602 and taper 604 is not at a surface of the resulting stiffened composite skin. By taper 604 overlapping taper 602 of flange 600 in an interior of the resulting stiffened composite skin, the flange runout is not exposed on a surface. Taper 604 overlapping taper 602 of flange 600 reduces peel stresses to the resulting interface. In this illustrative example, taper 604 and taper 602 will form a scarf joint.

Figure 7:
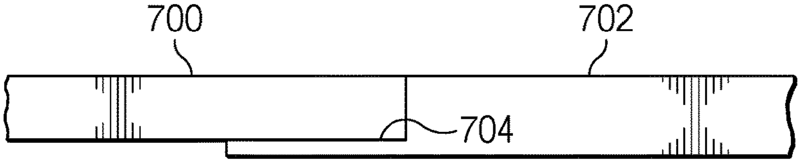
FIG. 7 is an illustration of a side view of a flange of a hat-shaped stiffener and a dry preform layer in accordance with an illustrative embodiment.

Turning now to FIG. 7, an illustration of a side view of a flange of a hat-shaped stiffener and a dry preform layer is depicted in accordance with an illustrative embodiment. Flange 700 can be present in a composite skin of one of body 106, wing 104, or wing 102 of aircraft 100 of FIG. 1. Flange 700 is a physical implementation of one of flanges 250 of FIG. 2. Flange 700 can be a portion of one of number of dry, hat-shaped preforms 304 of FIG. 3. Flange 700 of dry, hat-shaped preform 701 of FIG. 7 can be a portion of one of number of dry, hat-shaped preforms 400 of FIG. 4. In some illustrative examples, flange 700 is the same as flange 500.

Flange 700 and dry, skin-preform layer 702 form butt-joint 704. Flange 700 does not include a taper in this illustrative example.

Figure 8A:
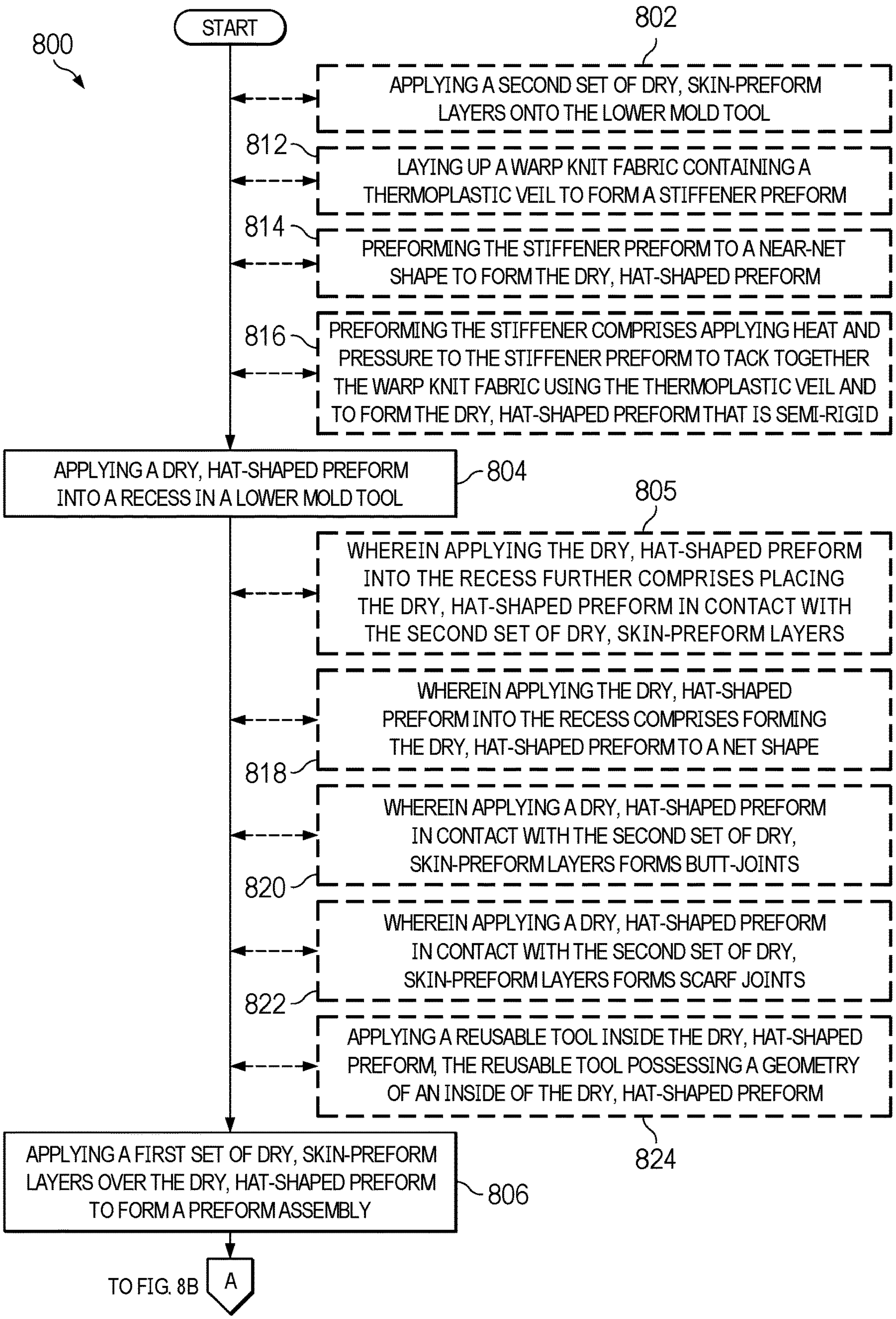
FIGS. 8A and 8B are a flowchart of a method of manufacturing a stiffened composite skin in accordance with an illustrative embodiment.
Figure 8B:

Turning now to FIGS. 8A and 8B, a flowchart of a method of manufacturing a stiffened composite skin is depicted in accordance with an illustrative embodiment. Method 800 can be used to form a stiffened composite skin for at least one of body 106, wing 104, or wing 102 of FIG. 1. Dry preform assembly 204 of FIG. 2 can be assembled and processed using method 800. Dry preform assembly 300 of FIG. 3 can be assembled and processed using method 800. Method 800 can be performed using number of dry, hat-shaped preforms 400 and second set of dry, skin-preforms 402 of FIG. 4. Method 800 can be performed using flange 500 of FIG. 5. Method 800 can be performed using dry, hat-shaped preform 601 and dry skin preform layer 606 of FIG. 6. Method 800 can be performed using dry, hat-shaped preform 701 and dry, skin-preform layer 702 of FIG. 7.

Method 800 applies a dry, hat-shaped preform into a recess in a lower mold tool (operation 804).

Method 800 applies a first set of dry, skin-preform layers over the dry, hat-shaped preform to form a dry preform assembly (operation 806). Method 800 infuses resin into the dry preform assembly to form a resin-infused preform (operation 808). Method 800 cures the resin-infused preform in situ to form the stiffened composite skin (operation 810). Afterwards, method 800 terminates.

In some illustrative examples, method 800 applies a second set of dry, skin-preform layers onto the lower mold tool (operation 802). In some illustrative examples, applying the dry, hat-shaped preform into the recess further comprises placing the dry, hat-shaped preform in contact with the second set of dry, skin-preform layers (operation 805). In some illustrative examples, applying the first set of dry, skin-preform layers over the dry, hat-shaped preform further comprises applying the first set of dry, skin-preform layers over the second set of dry, skin-preform layers (operation 807).

In some illustrative examples, method 800 lowers an upper mold tool over the dry preform assembly to form a vacuum-sealed perimeter around the dry preform assembly prior to infusing the resin, wherein infusing the resin into the dry preform assembly is performed while the dry preform assembly is within the vacuum-sealed perimeter (operation 828). In some illustrative examples, method 800 closes the upper mold tool onto the resin-infused preform to encapsulate the resin-infused preform to net cured-part dimensions prior to curing the resin-infused preform (operation 830).

In some illustrative examples, method 800 opens the tool by separating the upper mold tool and the lower mold tool for removal of the stiffened composite skin from the lower mold tool (operation 832). In some illustrative examples, method 800 post-processes the stiffened composite skin after removal from the lower mold tool (operation 834). In some illustrative examples, method 800 applies a reusable tool inside the dry, hat-shaped preform, the reusable tool possessing a geometry of an inside of the dry, hat-shaped preform (operation 824). In some illustrative examples, method 800 lays-up a warp-knit fabric containing a thermoplastic veil to form a stiffener preform (operation 812).

In some illustrative examples, method 800 preforms the stiffener preform to a near-net shape to form the dry, hat-shaped preform (operation 814).

In some illustrative examples, preforming the stiffener preform comprises applying heat and pressure to the stiffener preform to tack together the warp-knit fabric using the thermoplastic veil and to form the dry, hat-shaped preform that is semi-rigid (operation 816). By applying heat and pressure, the thermoplastic veil is at least partially softened to tack the warp-knit fabric.

In some illustrative examples, applying the dry, hat-shaped preform into the recess comprises forming the dry, hat-shaped preform to a net shape (operation 818).

In some illustrative examples, the dry, hat-shaped preform is slightly tapered from a first end to a second end longitudinally to enable easier removal of the stiffened composite skin after infusing resin and curing (operation 836). In these illustrative examples, removal of the stiffened composite skin is easier as the stiffened composite skin can be pulled in the direction of the smaller end of the taper.

In some illustrative examples, applying a dry, hat-shaped preform in contact with the second set of dry, skin-preform layers forms scarf joints (operation 822). In some illustrative examples, applying a dry, hat-shaped preform in contact with the second set of dry, skin-preform layers forms butt joints (operation 820).

In some illustrative examples, method 800 further comprises stitching through flanges of the dry, hat-shaped preform, the second set of dry, skin-preform layers, and the first set of dry, skin-preform layers (operation 826). In these illustrative examples, stitching provides additional resistance to peeling.

Figure 9:
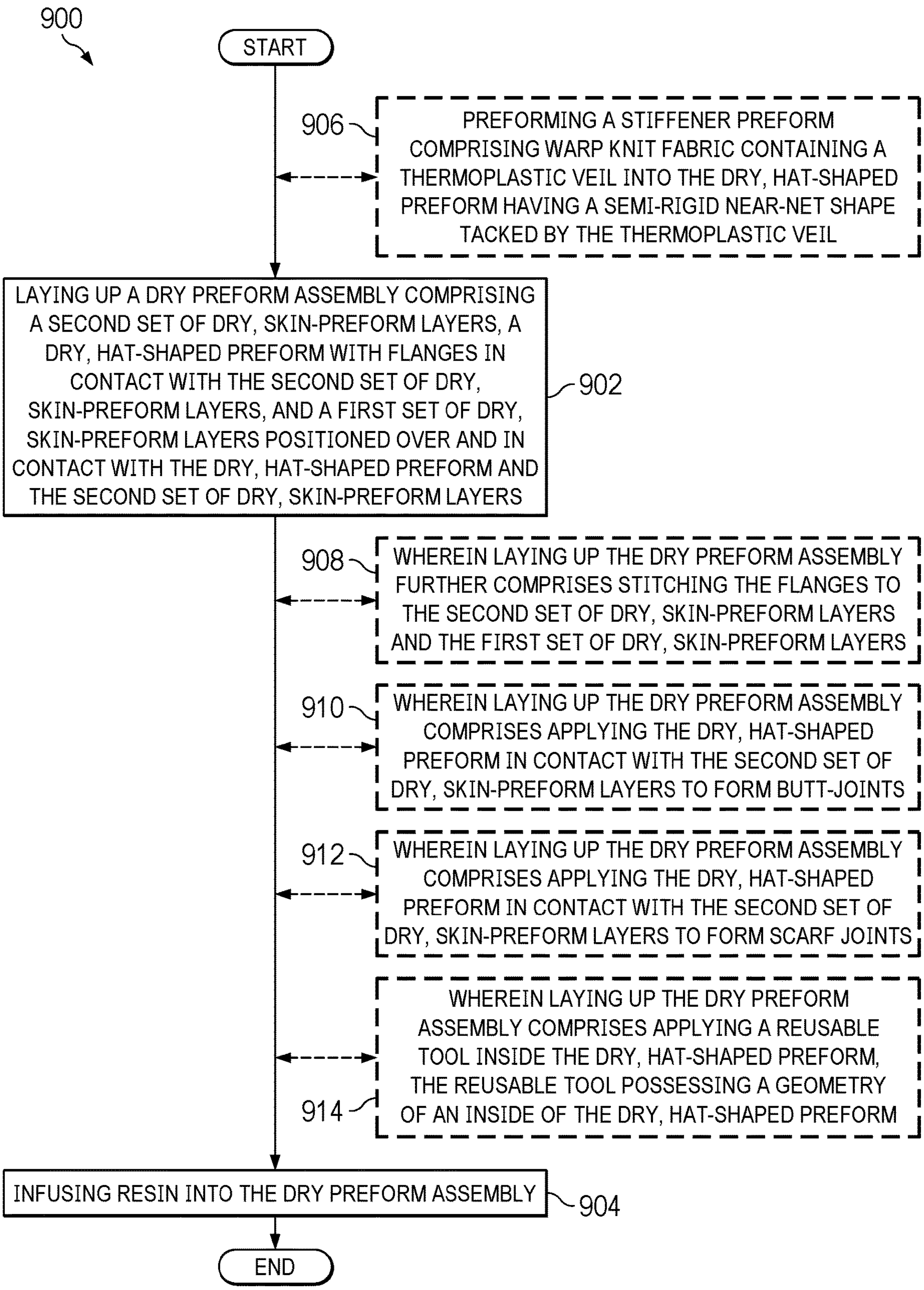
FIG. 9 is a flowchart of a method of manufacturing a stiffened composite skin in accordance with an illustrative embodiment.

Turning now to FIG. 9, a flowchart of a method of manufacturing a stiffened composite skin is depicted in accordance with an illustrative embodiment. Method 900 can be used to form a stiffened composite skin for at least one of body 106, wing 104, or wing 102 of FIG. 1. Dry preform assembly 204 of FIG. 2 can be assembled and processed using method 900. Dry preform assembly 300 of FIG. 3 can be assembled and processed using method 900. Method 900 can be performed using number of dry, hat-shaped preforms 400 and second set of dry, skin-preforms 402 of FIG. 4. Method 900 can be performed using flange 500 of FIG. 5. Method 900 can be performed using dry, hat-shaped preform 601 and dry, skin-preform layer 606 of FIG. 6. Method 900 can be performed using dry, hat-shaped preform 701 and dry, skin-preform layer 702 of FIG. 7.

Method 900 lays up a dry preform assembly comprising a second set of dry, skin-preform layers, a dry, hat-shaped preform with flanges in contact with the second set of dry, skin-preform layers, and a first set of dry, skin-preform layers positioned over and in contact with the dry, hat-shaped preform and the second set of dry, skin-preform layers (operation 902). Method 900 infuses resin into the dry preform assembly (operation 904). Afterwards, method 900 terminates.

In some illustrative examples, method 900 preforms a stiffener preform comprising warp-knit fabric with a thermoplastic veil into the dry, hat-shaped preform having a semi-rigid near-net shape tacked by the thermoplastic veil (operation 906). In some illustrative examples, laying up the dry preform assembly further comprises stitching the flanges to the second set of dry, skin-preform layers and the first set of dry, skin-preform layers (operation 908).

In some illustrative examples, laying up the dry preform assembly comprises applying the dry, hat-shaped preform in contact with the second set of dry, skin-preform layers to form butt joints (operation 910). In some illustrative examples, laying up the dry preform assembly comprises applying the dry, hat-shaped preform in contact with the second set of dry, skin-preform layers to form scarf joints (operation 912). In some illustrative examples, laying up the dry preform assembly comprises applying a reusable tool inside the dry, hat-shaped preform, the reusable tool possessing a geometry of an inside of the dry, hat-shaped preform (operation 914).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operations 802, 805, 807 and 812 through operation 836 may be optional. For example, operation 906 through operation 914 may be optional.

Figure 10:
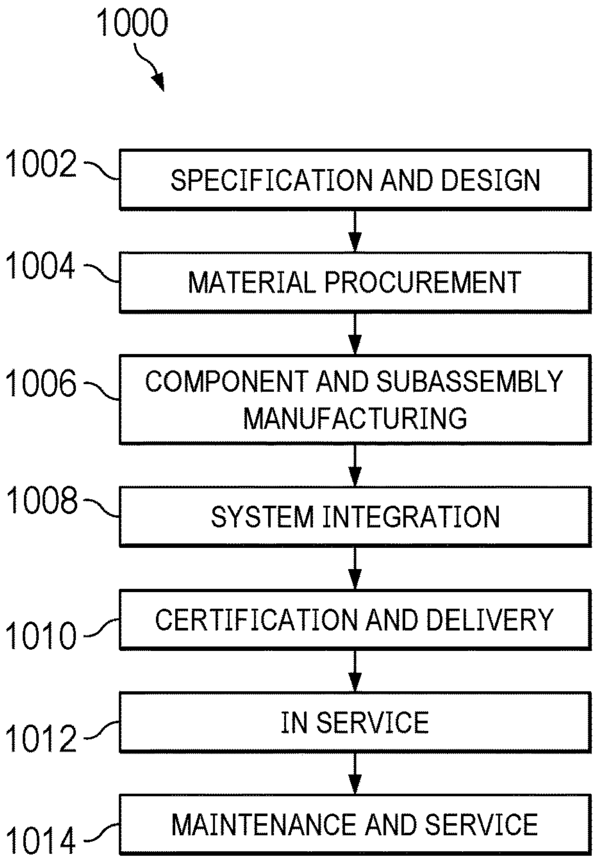
FIG. 10 is an illustration of an aircraft manufacturing and service method in a form of a block diagram in accordance with an illustrative embodiment.
Figure 11:
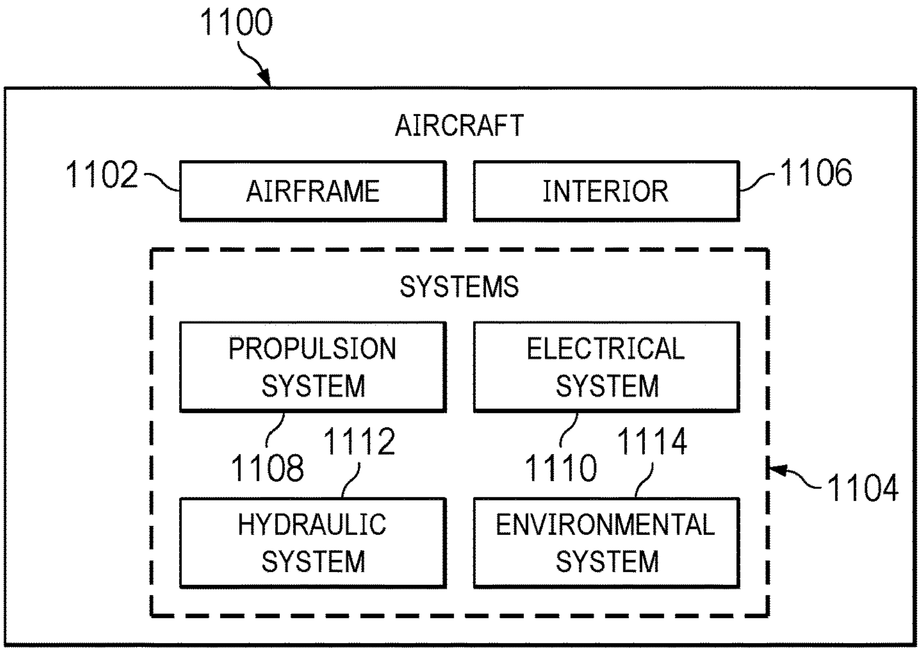
FIG. 11 is an illustration of an aircraft in a form of a block diagram in which an illustrative embodiment may be implemented.

Illustrative embodiments of the present disclosure may be described in the context of aircraft manufacturing and service method 1000 as shown in FIG. 10 and aircraft 1100 as shown in FIG. 11. Turning first to FIG. 10, an illustration of an aircraft manufacturing and service method in a form of a block diagram is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 takes place. Thereafter, aircraft 1100 may go through certification and delivery 1010 in order to be placed in service 1012. While in service 1012 by a customer, aircraft 1100 is scheduled for routine maintenance and service 1014, which may include modification, reconfiguration, refurbishment, or other maintenance and service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft in a form of a block diagram is depicted in which an illustrative embodiment may be implemented. In this example, aircraft 1100 is produced by aircraft manufacturing and service method 1000 of FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included.

Apparatuses and methods embodied herein may be employed during at least one of the stages of aircraft manufacturing and service method 1000. One or more illustrative embodiments may be manufactured or used during at least one of component and subassembly manufacturing 1006, system integration 1008, in service 1012, or maintenance and service 1014 of FIG. 10.

A portion of airframe 1102 of aircraft 1100 can be formed by one of method 800 or method 900. At least one of method 800 or method 900 can be performed during component and subassembly manufacturing 1006. A composite structure formed using one of method 800 or method 900 can be present and utilized during in service 1012. At least one of method 800 or method 900 can be performed during maintenance and service 1014 to form a replacement part.

The illustrative examples present fabrication of large, hat-stiffened structures, such as for aircraft wings. The illustrative examples provide robust provisions for tool reusability and for flange interleaving. The illustrative examples utilize dry preforms, optional interleaving, reusable removable tooling, and resin infusion to enable the fabrication of hollow stiffening elements like hat stringers. The illustrative examples provide for ease of removal of the cured part from the tool, robust stiffener/skin joints, rapid removal of tooling from the hollow elements, and a fully integrated structure.

A goal of the illustrative examples is to avoid separate stringer tooling for either transportation or resin infusion of the dry, hat-shaped preform. The dry, hat-shaped preform is not resin-infused prior to placement in a recess in a lower mold tool. The dry, hat-shaped preform is not fully consolidated prior to placement. The dry, hat-shaped preform can be moved by hand due to the semi-rigid nature of the dry, hat-shaped preform. In the illustrative examples, stiffeners are slightly tapered from root (thick end of part) to tip (thinner end of part) to ease part removal after curing. In some illustrative examples, stiffener details are pre-heat-set or otherwise formed to stable shape for ease of handling. Stiffener details are self-locating in tool.

The illustrative examples use near-net-shaped hat preforms that are loaded into a female mold tool. The illustrative examples interleave the flange with skin detail to reduce/avoid peel loads. The illustrative examples cover the hat preforms and skin detail with base skin plies and then infuse the assembly with a resin using a closed mold or a tooled bag side over the aero surface. Parts are cured in situ in the tool and can be post-processed, as needed. In some illustrative examples, the flanges are stitched to the skin to increase damage tolerance.

In the illustrative examples, the skin taper overlaps the flange taper to bury the interface in the interior of the skin so that the flange runout is not exposed on the surface. Burying the interface in the interior of the skin can cause the interface to not be prone to peel stresses. In some illustrative examples, the skin detail is thicker than stringer flange so that stiffener/skin interface is not at the part surface.

The illustrative examples provide for ease of removal of large parts with stiffening elements from tooling. The illustrative examples remove/reduce the use of offline preform compaction of stiffening elements.

The use of hat stiffeners instead of blade stiffeners allows for elimination of pre-infusion or in-tool blade compaction. The illustrative examples are potentially lighter in weight due to use of hats vs. blades for stiffening.

The use of hat stiffeners enables easier part removal from tool after curing. In some illustrative examples, a slight taper in width of hat stiffeners along length allows for easier part removal. In some illustrative examples, tapered stiffening elements ease part removal from tool. The illustrative examples provide for ease of part removal from tool after curing by avoidance of features that could cause part to be trapped in tooling.

In some illustrative examples, the hat stiffeners made using reusable, removable bladders. In some illustrative examples, hollow stiffening elements made using reusable tooling are utilized in resin infusing the hat stiffeners.

The illustrative examples mitigate peel loads at ends of the hat shaped stiffener flanges through interleaving. Interleaving of the hat stiffener flanges minimizes stresses and redistributes peel loads that could cause stiffener/skin debonding. In some illustrative examples, the interleaved flanges within skin laminate are below part surface.

The illustrative examples use near-net-shape, dry preform fabrics. The illustrative examples use resin infusion to produce composite from preform. The illustrative examples use resin infusion to allow for integration of stiffening elements using dry fabric, which is simpler than doing so with prepreg or via secondary attachment, such as co-bond, co-cure, or secondary bonding.

The illustrative examples provide a combination of at least one of hat stiffeners, flange interleaving, reusable tooling for hollow elements, and resin infusion to produce a single-piece, integrated structure suitable for aerospace structures like wings, etc., with easy part removal from tool after curing. The illustrative examples recognize and take into account that using hat shaped stiffeners can result in a thicker gauge skin geometry. The illustrative examples recognize and take into account that blade stringers would provide simpler tooling than for hat-shaped stiffeners.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of manufacturing a stiffened composite skin comprising:

applying a dry, hat-shaped preform into a recess in a lower mold tool;

applying a first set of dry, skin-preform layers over the dry, hat-shaped preform to form a dry preform assembly;

applying a second set of dry, skin-preform layers onto the lower mold tool, wherein applying the dry, hat-shaped preform into the recess further comprises placing the dry, hat-shaped preform in contact with the second set of dry, skin-preform layers to form a joint without extending into the recess;

infusing resin into the dry preform assembly to form a resin-infused preform; and curing the resin-infused preform in situ to form the stiffened composite skin.

2. The method of claim 1 further comprising:

lowering an upper mold tool over the dry preform assembly to form a vacuum-sealed perimeter around the dry preform assembly prior to infusing the resin, wherein the upper mold tool and the lower mold tool together form a tool, and wherein infusing the resin into the dry preform assembly is performed while the dry preform assembly is within the vacuum-sealed perimeter.

3. The method of claim 2 further comprising:

closing the upper mold tool onto the resin-infused preform to encapsulate the resin-infused preform to net cured-part dimensions prior to curing the resin-infused preform.

4. The method of claim 2 further comprising:

opening the tool by separating the upper mold tool and the lower mold tool for removal of the stiffened composite skin from the lower mold tool; and post-processing the stiffened composite skin after removal from the lower mold tool.

5. The method of claim 1 further comprising:

applying a reusable tool inside the dry, hat-shaped preform, the reusable tool possessing a geometry of an inside of the dry, hat-shaped preform.

6. The method of claim 1 further comprising:

laying up a warp-knit fabric containing a thermoplastic veil to form a stiffener preform.

7. The method of claim 6 further comprising:

preforming the stiffener preform to a near-net shape to form the dry, hat-shaped preform.

8. The method of claim 7, wherein:

preforming the stiffener preform comprises applying heat and pressure to the stiffener preform to tack together the warp-knit fabric using the thermoplastic veil and to form the dry, hat-shaped preform that is semi-rigid.

9. The method of claim 1, wherein applying the dry, hat-shaped preform into the recess comprises forming the dry, hat-shaped preform to a net shape.

10. The method of claim 1, wherein the dry, hat-shaped preform is slightly tapered from a first end to a second end longitudinally to enable easier removal of the stiffened composite skin after infusing resin and curing.

11. The method of claim 1, wherein applying the first set of dry, skin-preform layers over the dry, hat-shaped preform further comprises applying the first set of dry, skin-preform layers over the second set of dry, skin-preform layers.

12. The method of claim 11, wherein applying a dry, hat-shaped preform in contact with the second set of dry, skin-preform layers forms scarf joints.

13. The method of claim 11, wherein applying a dry, hat-shaped preform in contact with the second set of dry, skin-preform layers forms butt joints.

14. The method of claim 11 further comprising:

stitching through flanges of the dry, hat-shaped preform, the first set of dry, skin-preform layers, and the second set of dry, skin-preform layers.

15. The method of claim 1 further comprising stitching connecting flanges of the dry, hat-shaped preform to the first set of dry, skin-preform layers.

16. A method of manufacturing a stiffened composite skin comprising:

laying up a dry preform assembly comprising a second set of dry, skin-preform layers, a dry, hat-shaped preform with flanges in contact with the second set of dry, skin-preform layers, and a first set of dry, skin-preform layers positioned over and in contact with the dry, hat-shaped preform and the second set of dry, skin-preform layers, wherein laying up the dry preform assembly comprises applying the dry, hat-shaped preform in contact with the second set of dry, skin-preform layers to form a joint comprising at least one of a scarf joint, a butt joint, or an interleaved joint; and infusing resin into the dry preform assembly.

17. The method of claim 16, wherein laying up the dry preform assembly comprises applying the dry, hat-shaped preform in contact with the second set of dry, skin-preform layers to form scarf joints.

18. The method of claim 16, wherein laying up the dry preform assembly comprises applying the dry, hat-shaped preform in contact with the second set of dry, skin-preform layers to form butt joints.

19. The method of claim 16 further comprising:

preforming a stiffener preform comprising warp-knit fabric with a thermoplastic veil into the dry, hat-shaped preform having a semi-rigid near-net shape tacked by the thermoplastic veil.

20. The method of claim 19, wherein preforming the stiffener preform comprises applying heat and pressure to the stiffener preform to tack together the warp-knit fabric using the thermoplastic veil and to form the dry, hat-shaped preform that is semi-rigid.

21. The method of claim 19 wherein infusing the dry preform assembly forms a resin-infused preform, the method further comprising:

curing the resin-infused preform in situ to form the stiffened composite skin.

22. The method of claim 21 further comprising:

lowering an upper mold tool over the dry preform assembly to form a vacuum-sealed perimeter around the dry preform assembly prior to infusing the resin, wherein the upper mold tool and a lower mold tool together form a tool, and wherein infusing the resin into the dry preform assembly is performed while the dry preform assembly is within the vacuum-sealed perimeter.

23. The method of claim 22 further comprising:

closing the upper mold tool onto the resin-infused preform to encapsulate the resin-infused preform to net cured-part dimensions prior to curing the resin-infused preform.

24. The method of claim 16, wherein laying up the dry preform assembly comprises applying a reusable tool inside the dry, hat-shaped preform, the reusable tool possessing a geometry of an inside of the dry, hat-shaped preform.

25. The method of claim 16, wherein laying up the dry preform assembly further comprises stitching the flanges to the second set of dry, skin-preform layers and the first set of dry, skin-preform layers.

26. The method of claim 16, wherein the second set of dry, skin-preform layers have a greater thickness than a thickness than the flanges of the dry, hat-shaped preform.

27. The method of claim 16, wherein the dry, hat-shaped preform and the second set of dry, skin-preform layers form interleaved joints.

28. The method of claim 16, wherein the dry, hat-shaped preform is semi-rigid and tacked together with a thermally activated binder.

29. The method of claim 16, wherein the dry, hat-shaped preform comprises warp-knit fabric.

* * * * *